No. 663,136. Patented Dec. 4, 1900.
L. P. STRAUBE.
BOTTLE FILLING DEVICE.
(Application filed Mar. 30, 1900.)
(No Model.)
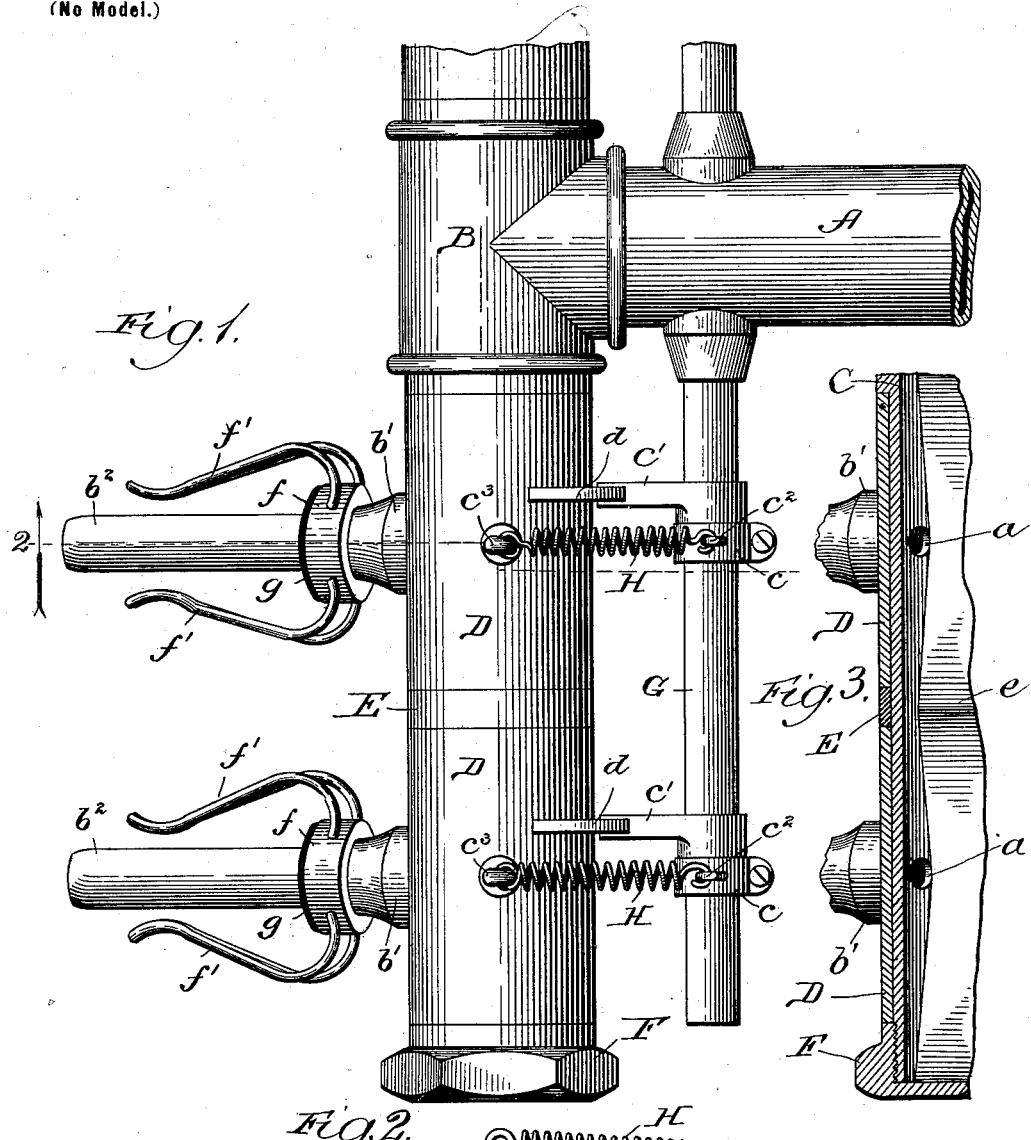
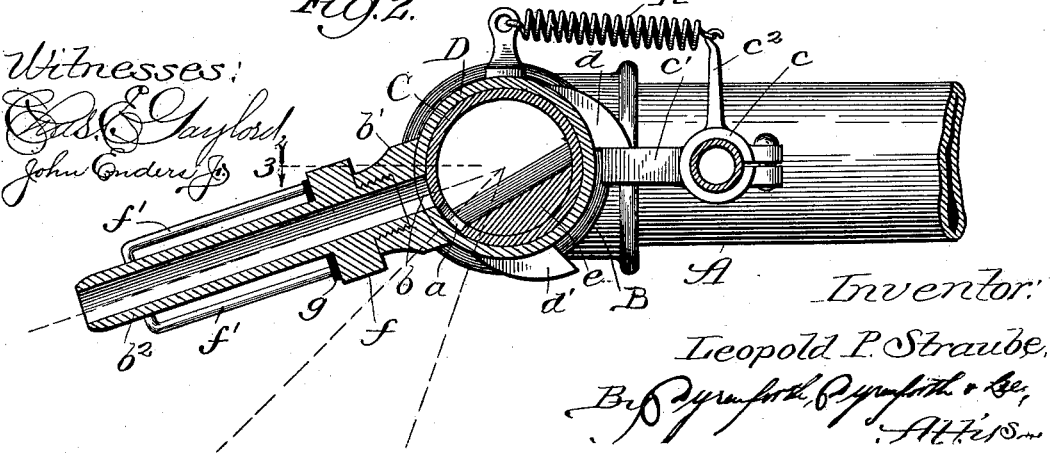
Witnesses:
Chas. E. Gaylord
John Enders Jr.
Inventor:
Leopold P. Straube,
By Dyrenforth, Dyrenforth & Lee,
Attys.
THE NORRIS PETERS CO., PHOTO-LITHO., WASHINGTON, D. C.

UNITED STATES PATENT OFFICE.

LEOPOLD P. STRAUBE, OF CHICAGO, ILLINOIS, ASSIGNOR OF ONE-HALF TO ROBERT M. MAHLER, OF SAME PLACE.

BOTTLE-FILLING DEVICE.

SPECIFICATION forming part of Letters Patent No. 663,136, dated December 4, 1900.

Application filed March 30, 1900. Serial No. 10,783. (No model.)

*To all whom it may concern:*

Be it known that I, LEOPOLD P. STRAUBE, a citizen of the United States, residing at Chicago, in the county of Cook and State of Illinois, have invented a new and useful Improvement in Bottle-Filling Devices, of which the following is a specification.

My invention relates particularly to an improved device for use in filling bottles; and my object is to provide a device of simple construction for the purpose capable of automatically closing the supply when a given amount of liquid has entered the bottle.

In the accompanying drawings, Figure 1 is a broken plan view of my improved bottle-filling device; Fig. 2, a transverse section on line 2 of Fig. 1, and Fig. 3 a broken horizontal section on line 3 of Fig. 2.

A represents a supply-pipe which, it will be understood, is to be placed in communication with the lower portion of a tank or other supply source; B, a T-coupling joined at its branch connection to the pipe A; C, a branch supply-pipe joined to one of the ends of the coupling B and supplied with lateral discharge-orifices $a$; D, cylindrical valves fitting closely upon the pipe C and provided each with a discharge-orifice $b$, a nipple-socket $b'$, and a nipple $b^2$; E, a collar separating the sleeves D; F, a cap for the pipe C, which screws onto the end thereof; G, a stop-bearing rod projecting from the pipe A and provided with fixed stops $c'$ and with collars $c$, bearing spring-attaching standards $c^2$, and H springs joining the standards $c^2$ to the lugs $c^3$, with which the sleeves D are provided. Each sleeve D is provided with stops $d\ d'$. The discharge-orifices of the pipe C are below the center of the pipe, and the pipe is provided with a partial filling $e$, the top surface of which slopes generally toward the front side of the pipe, as shown in Fig. 2, and is provided with transverse hollows at the discharge-orifices $a$, as shown in Fig. 3. When a sleeve D is in such position that its stop $d$ engages a stop $c'$, the orifice $b$ of the sleeve is slightly above the orifice $a$. This is the normal position in which the spring holds the sleeve or valve. The nipples are shown provided with threaded shanks which screw into the nipple-sockets $b'$. Each nipple is further provided, adjacent to its threaded shank, with a collar or flange $f$, from which project spring bottle-neck retainers $f'$. These retainers extend in the same general direction as the nipple which they flank and are curved to receive and retain a flanged bottle-neck. It will now be understood that when a bottle is placed upon a nipple the weight is sufficient to turn the valve to admit liquid from the pipe C. As the weight increases the valve is moved farther and farther, till finally the supply is cut off. On the removal of the bottle the valve flies back to its original position. The several valves act independently of each other, as is readily understood. It may now be stated that the arrangement on the opposite side of the pipe A is an exact duplication of the arrangement described. Hence it has not been deemed necessary to show the same in full.

It will be readily understood that the branch pipes may be made of such length as to receive any number of valves D, the broad idea of my invention being that of a supply-pipe having a lateral discharge-orifice and with a cylindrical valve thereon having a lateral discharge-orifice and provided with means for securing a vessel, so that it shall act as a turning-lever for the valve-stops so disposed as to allow automatic cut-off in either direction being supplied. The nipples are detachable from their sockets, as shown, and they may be removed and replaced by others of a different size. They are shown provided with washers $g$, of soft material, the purpose whereof is to prevent chipping of the bottle-necks. The collars $c$, bearing the standards $c^2$, are split and provided with lugs and tightening-screws, as shown, the purpose whereof is to make the standards adjustable or capable of being rocked upon the rod G to change the tension of the springs H. Thus bottles of different sizes may be filled or different quantities of liquid may be put into bottles of a given size.

What I claim as new, and desire to secure by Letters Patent, is—

1. The combination with a supply-pipe having a lateral discharge-orifice, of a cylindrical valve thereon having a lateral discharge-orifice normally out of registration with said first-named orifice, means for yieldingly holding said valve in its normally-closed position, said valve being left free to be rotated by the bottle and its contents to cut off the supply automatically when the bottle is filled, and a nipple projecting from the orifice of said valve and adapted to receive the vessel to be filled, substantially as and for the purpose set forth.

2. The combination with a supply-pipe having a lateral discharge-orifice, of a cylindrical valve thereon having a lateral discharge-orifice normally out of registration with said first-named orifice, means for yieldingly holding said valve in its normally-closed position, a nipple projecting from the orifice of said valve and adapted to receive a vessel to be filled and stops located to limit the rotation of the valve in each direction after the supply has been cut off, substantially as and for the purpose set forth.

3. The combination with a main supply-pipe, of a union connected therewith, a branch supply-pipe connected with said union and provided with a lateral discharge-orifice, an end cap for said branch supply-pipe, a cylindrical valve upon said branch supply-pipe provided with a laterally-projecting nipple, a spring for normally holding said nipple out of registration with said orifice, and stops on said valve for limiting the rotation thereof in both directions, said stops being disposed to allow the valve to rotate far enough in either direction to cut off automatically, substantially as and for the purpose set forth.

4. The combination with a supply-pipe provided with a lateral discharge-orifice, of a cylindrical valve thereon provided with a laterally-projecting nipple, spring bottle-neck-receiving retainers connected with said nipple, means for yieldingly holding said valve normally closed, and stops for limiting the movement of said valve, substantially as and for the purpose set forth.

5. The combination with a supply-pipe having a lateral discharge-orifice, of a filling in said pipe having inclined surfaces for conducting the liquid to said discharge-orifice, an end cap for said pipe, a cylindrical valve upon said pipe, a spring for normally holding said valve in its closed position, and stops for limiting the movement of said valve, substantially as and for the purpose set forth.

6. The combination with an integrally-formed supply-pipe having lateral discharge-orifices, of a plurality of valves thereon having discharge-orifices normally out of registration with said first-named orifices, a loose collar on said supply-pipe and in contact with and separating adjacent valves, nipples connected with said valves at their discharge-orifices, means for yieldingly holding said valves in a closed position, and an end cap for said pipe, substantially as and for the purpose set forth.

7. The combination with a supply-pipe having a lateral discharge-orifice, of a cylindrical valve thereon having a lateral discharge-orifice, a stop-bearing rod adjacent to said supply-pipe, a stop carried by said rod, a stop on said valve adapted to engage said first-named stop, an adjustable standard on said rod, a spring connecting said standard to said valve, and a nipple at the discharge-orifice of said valve, substantially as and for the purpose set forth.

LEOPOLD P. STRAUBE.

Witnesses:
D. W. LEE,
A. D. BACCI.